(12) United States Patent
Aher et al.

(10) Patent No.: US 11,972,779 B2
(45) Date of Patent: Apr. 30, 2024

(54) SYSTEM AND METHOD FOR PROVISION OF INDIVIDUALIZED MEETING PLATFORM CONTENT

(71) Applicant: Rovi Guides, Inc., San Jose, CA (US)

(72) Inventors: Ankur Anil Aher, Maharashtra (IN); Sakshi Jain, Karnataka (IN); Amanpreet Singh, Punjab (IN); Cato Yang, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/131,495

(22) Filed: Apr. 6, 2023

(65) Prior Publication Data
US 2023/0260551 A1  Aug. 17, 2023

Related U.S. Application Data

(63) Continuation of application No. 17/377,224, filed on Jul. 15, 2021, now Pat. No. 11,651,796.

(51) Int. Cl.
| | | |
|---|---|---|
| *G11B 27/031* | (2006.01) | |
| *G06F 3/16* | (2006.01) | |
| *H04N 5/76* | (2006.01) | |
| *G06Q 10/109* | (2023.01) | |

(52) U.S. Cl.
CPC .......... *G11B 27/031* (2013.01); *G06F 3/165* (2013.01); *H04N 5/76* (2013.01); *G06Q 10/109* (2013.01)

(58) Field of Classification Search
CPC .......... G11B 27/031; G06F 3/165; H04N 5/76
See application file for complete search history.

(56) References Cited

U.S. PATENT DOCUMENTS

| | | | |
|---|---|---|---|
| 2008/0172406 A1 | 7/2008 | Takeda et al. | |
| 2008/0263010 A1 | 10/2008 | Roychoudhuri et al. | |
| 2019/0171716 A1 | 6/2019 | Weber | |
| 2020/0174739 A1* | 6/2020 | Boss | H04M 3/568 |
| 2020/0243094 A1* | 7/2020 | Thomson | G10L 15/32 |
| 2022/0414349 A1* | 12/2022 | Rathnam | G06F 40/58 |
| 2023/0013497 A1 | 1/2023 | Aher et al. | |

\* cited by examiner

*Primary Examiner* — Mishawn N. Hunter
(74) *Attorney, Agent, or Firm* — Haley Guiliano LLP

(57) ABSTRACT

Systems and methods for providing individualized meeting content to participants in online meetings. Participant preferences may be summarized and displayed for speakers to see and attempt to follow, thus increasing the likelihood that meetings will progress according to the preferences of their attendees. Participants may also have their individual meeting feeds tailored to their preferences, if those preferences can be met in real time, during the meeting. Participants may further receive individual recordings of the meetings afterward, for those preferences that cannot be met in real time. In this manner, meeting participants may experience personalized versions of meetings, tailored to their particular preferences. This may improve participant interest in, and engagement with, online meetings.

20 Claims, 7 Drawing Sheets

SYSTEM AND METHOD FOR PROVISION OF INDIVIDUALIZED MEETING PLATFORM CONTENT

CROSS-REFERENCE TO RELATED APPLICATIONS

This application is a continuation of U.S. application Ser. No. 17/377,224, filed Jul. 15, 2021. The disclosure of which is hereby incorporated by reference herein in its entirety.

BACKGROUND

Embodiments of the disclosure relate generally to online meeting platforms. More specifically, embodiments of the disclosure relate to provision of individualized meeting platform content.

SUMMARY

Online meeting platforms are widely used to allow groups of people to communicate with each other in real time, without the need to be in the same physical location. This has many benefits, such as reducing time wasted in traveling or commuting to meeting sites, allowing participants to join, leave, mute, or amplify a meeting at any time without disturbing any other meeting participants, allowing for easy viewing of presentation materials, and the like. Online meeting platforms also present certain challenges, though. Meeting platforms display the same meeting content to every participant, which can lead to annoyance and lack of engagement if the content parameters are disliked by some participants. For example, some meeting participants may lose interest in speakers that speak too fast or too slow, or in a language that those participants do not understand.

Accordingly, to overcome the limited ability of computer-based online meeting platforms to maintain engagement of meeting participants, systems and methods are described herein for a computer-based process that determines meeting participants' preferred parameters for listening to a meeting, and attempts to deliver customized meeting content for each participant according to his or her preferred parameters. For example, participants may be allowed to view the meeting at their individually-preferred volume, speed, or the like. Participants may also be sent a recording of the meeting that can be played back according to their individual preferences, e.g., in the language of their preference, at the speed of their preference, or the like. Meeting participant preferences may also be displayed for each meeting speaker or presenter, so that he or she may adjust their presentation style according to the displayed preferences. In this manner, meetings may be more likely to progress according to the preferences of each participant, thus increasing participant interest and engagement in the meeting.

In some embodiments of the disclosure, a computer-based online meeting system retrieves preferences of meeting participants, and determines those preferences that cannot be satisfied by meeting content, such as live or real time presentations of the meeting, during the meeting itself. For example, when a preference exists for Spanish to be spoken during the meeting, but the speaker or speakers do not speak Spanish, the speakers cannot meet this preference during the meeting. Accordingly, a personalized recording of the meeting is generated for each participant according to those individual preferences that cannot be satisfied during the meeting. In this example, audio of the recording is translated into Spanish, and sent to those participants with a preference for Spanish.

The system may also determine those participant preferences that can be satisfied during the meeting, and display the meeting for those participants according to their preferences. That is, for those participant preferences that can be met during the meeting itself, the meeting is shown to those participants according to those preferences.

In summary, each meeting participant may receive a live feed of the meeting, with each feed tailored to the individual participant's preferences to the extent possible during the meeting. Each participant may also, or alternatively, receive a recording of the meeting that is tailored to each individual participant's preferences, including those preferences that cannot be met by a live feed. This may help increase participant interest and engagement with the meeting subject matter.

Participant preferences may be any preferences for manner of content delivery. For example, preferences may include preferences for a particular language, a particular speech speed or speed at which content is delivered, a preferred volume, or any other parameter by which content may be adjusted for delivery.

Participant preferences may also be displayed for speakers, presenters, or anyone else to see during the meeting. For example, preferences may be displayed in the same screen or interface as the online meeting. This allows speakers or presenters to see the preferences of their fellow meeting attendees, and adjust their speaking style as appropriate. As examples, meeting speakers can adjust the speed at which they talk to better suit other participants, may speak louder or quieter, speak in different languages if possible, or the like.

Preferences can be selected for display to participants in any manner. In some embodiments, every participant preference may be displayed to speakers, presenters, or the like. in some embodiments, preferences such as speaking speed (e.g., preferred number of words per minute, or wpm) may be averaged in any manner, with this average presented to speakers as a single preferred value. In some embodiments, if a particular preference is expressed by a majority or any other threshold number or portion of meeting participants, that preference may be displayed to speakers. For example, if a majority but not all participants express a desire for Spanish as the language of the meeting, the system may indicate that Spanish is the desired language for the meeting. In some embodiments, one or more preferences may be used to determine a presentation style which may be displayed for the speaker, rather than the preference itself. For example, if a speaker is detected as speaking approximately 30 wpm but a majority of participants have a preference for 50 wpm, the system may simply inform the speaker that the audience wishes him or her to speak faster, rather than (or in addition to) speaking at a particular wpm value.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for providing individualized meeting content to participants in online meetings. Participant preferences may be summarized and displayed for speakers to see and attempt to follow, thus increasing the likelihood that meetings will progress according to the preferences of their attendees. Participants may also have their individual meeting feeds tailored to their preferences, if those preferences can be met in real time, during the meeting. Participants may further receive individual recordings of the meetings afterward, for those preferences that cannot be met in real time. In this manner, meeting participants may experience personalized versions of meetings, tailored to their particular preferences. This may improve participant interest in, and engagement with, online meetings.

Figure 1A:
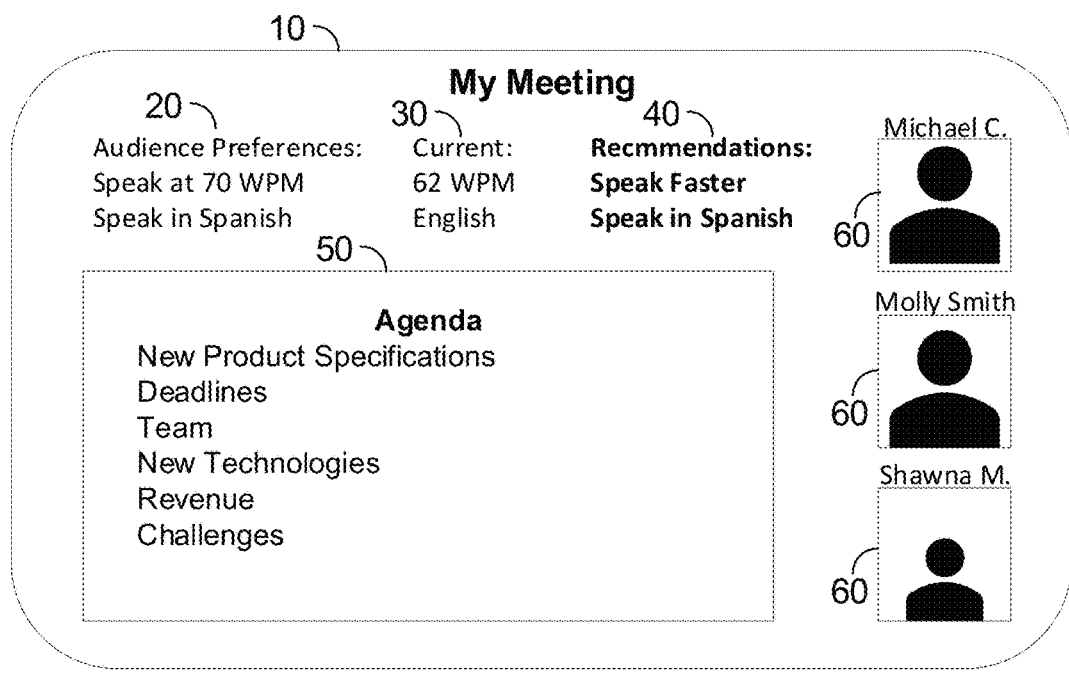
FIG. 1A is an online meeting interface illustrating participant preferences displayed in accordance with embodiments of the disclosure.

FIG. 1A is an online meeting interface illustrating participant preferences displayed in accordance with embodiments of the disclosure. Here, a meeting interface 10 may be the user interface of an online meeting program or application. In some embodiments, the interface 10 may display a meeting, providing an online forum for each meeting participant to discuss and view materials related to the subject matter of the meeting. The interface 10 may display audience preferences 20 which are preferences expressed by meeting participants, current metrics 30 which are metrics of the current speaker, and recommendations 40 presented to the current speaker. Interface 10 may also include a window 50 for display of any meeting-related materials such as presentation materials, as well as thumbnails 60 displaying meeting participants. Speakers and other meeting participants may each be presented with an individual interface 10 displaying other participants 60, and meeting materials window 50. Meeting speakers or presenters may have preferences 20, metrics 30, and recommendations 40 displayed on their interfaces 10, which may induce them to speak according to styles preferred by the other meeting participants. In some embodiments of the disclosure, preferences 20, metrics 30, and recommendations 40 are presented only to the current speaker, or alternatively to each planned speaker. In some other embodiments of the disclosure, preferences 20, metrics 30, and recommendations 40 may be presented to any or all meeting participants.

Figure 1B:
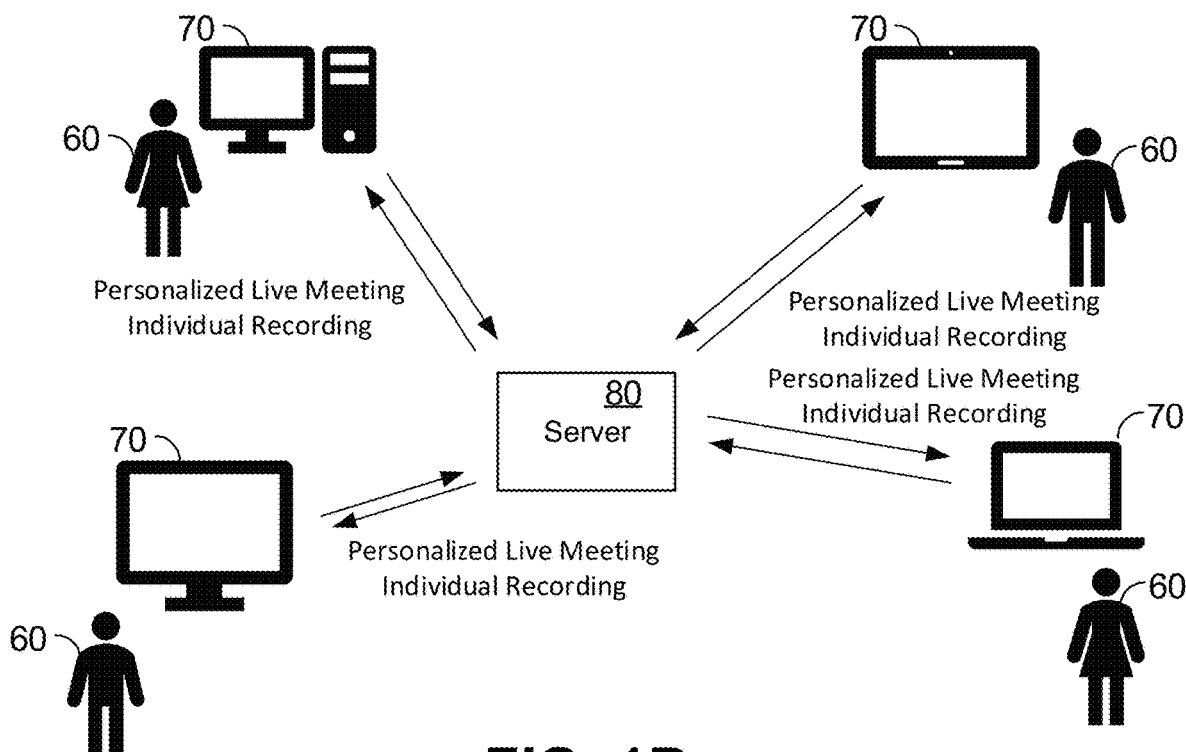
FIG. 1B is a diagrammatic representation illustrating operation of an online meeting system in accordance with embodiments of the disclosure.

FIG. 1B is a diagrammatic representation illustrating operation of an online meeting system in accordance with embodiments of the disclosure. The meeting system of FIG. 1B includes a central server 80 providing online meeting services for each display device 70 belonging to meeting participants 60. In particular, server 80 generates audio and video signals for display in interfaces 10 of each device 70, retrieves and displays audience preferences 20, and generates and displays metrics 30 and recommendations 40. Each interface 10 of each display device 70 allows its associated participant 60 to speak as well as view those speaking. That is, each device 70 may both transmit audio and video to, and receive audio and video from, server 80. Server 80 may generate an individualized interface 10 for each separate participant 60, displaying its constituent images and information according to the preferences expressed by each participant 60. That is, for those participant 60 preferences that can be met in real time, server 80 modifies the audio and video signals accordingly, and transmits meeting content to each participant 60 according to his or her individual preferences. Accordingly, each different display device 70 receives and displays a different version of interface 10 with meeting content customized according to the individual preferences of each participant 60. Thus, for example, each participant 60 may view the meeting at a different volume, according to their preferences. Display devices 70 may be any device capable of displaying a computer-based interface 10, and transmitting and receiving audio and video signals, such as a cellular phone, tablet computer, laptop computer, desktop computer, server, or the like.

After the meeting, server 80 may also generate a customized recording of the meeting for each participant 60. More specifically, server 80 may record the meeting as it occurs, alter the recording according to the preferences of each participant 60, and subsequently send the recording to each participant 60 for playback according to his or her individual preferences. As one example, a meeting may be conducted in English, but some participants 60 may express a preference for Spanish instead. The meeting speakers or presenters may not speak Spanish, and accordingly the meeting may not be capable of being translated into Spanish in real time by the speakers. Furthermore, other participants may prefer English rather than Spanish. After the meeting, server 80 may thus automatically translate the recorded audio signal of the meeting into Spanish, and transmit the recording to those participants 60 that expressed a preference for Spanish. Similarly, server 80 may generate recordings that are sped up or slowed down to meet the wpm preferences of each different participant 60, and send each participant 60 a custom recording set for playback at their preferred speed. In this manner, server 80 may generate a custom live broadcast of the meeting for each participant 60 according to those individual preferences that can be satisfied during the meeting, and generate a custom recording for each participant 60 set to those individual preferences that cannot be satisfied during the meeting. In some embodiments then, each participant 60 thus receives both a custom individualized live meeting feed altered to match perhaps some of their preferences, as well as a custom individualized recording altered to match perhaps all of their preferences.

Figure 2:
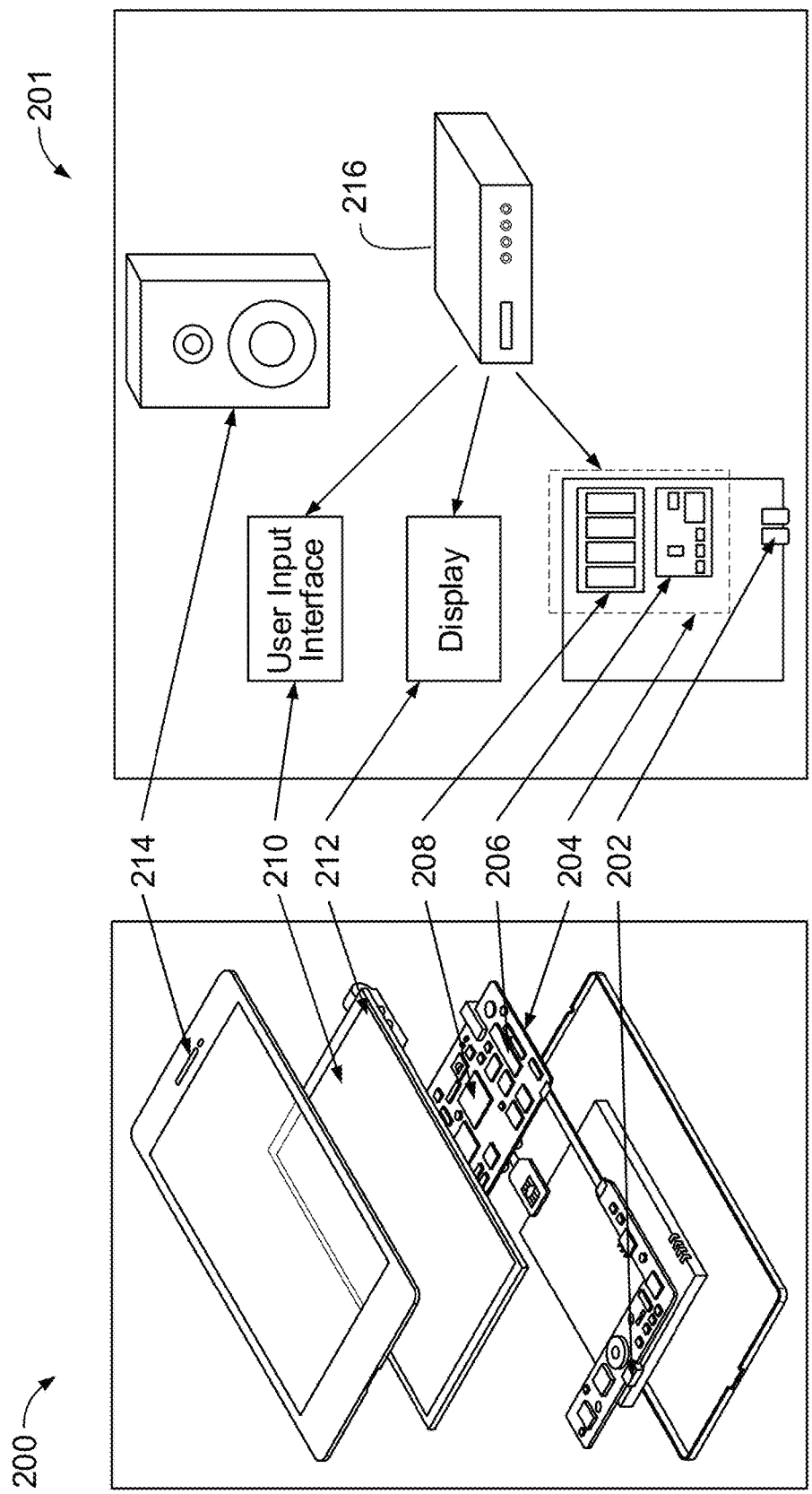
FIG. 2 is a block diagram of an illustrative user equipment device in accordance with embodiments of the disclosure.

FIG. 2 shows generalized embodiments of illustrative user equipment device 200 that may be used in provision of individualized meeting platform content according to embodiments of the disclosure. For example, user equipment device 200 may be an implementation of a display device 70, and in exemplary embodiments may be a smartphone device or a remote control. In another example, user equipment system 201 may be a user television equipment system. User television equipment system 201 may include a set-top box 216. Set-top box 216 may be communicatively connected to speaker 214 and display 212. In some embodiments, display 212 may be a television display or a computer display. In some embodiments, set top box 216 may be communicatively connected to user interface input 210. In some embodiments, user interface input 210 may be a remote-control device. Set-top box 216 may include one or more circuit boards. In some embodiments, the circuit boards may include processing circuitry, control circuitry, and storage (e.g., RAM, ROM, hard disk, removable disk, etc.). In some embodiments, circuit boards may include an input/output path. More specific implementations of user equipment devices are discussed below in connection with FIGS. 3 and 4.

Each one of user equipment device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for an application program stored in memory (e.g., storage 208). Specifically, control circuitry 204 may be instructed by the application to perform the functions discussed above and below. For example, the application may provide instructions to control circuitry 204 to generate a content curation interface. In some implementations, any action performed by control circuitry 204 may be based on instructions received from the interface.

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 4, may be used to supplement storage 208 or instead of storage 208.

A user may send instructions to control circuitry 204 using user input interface 210. User input interface 210 may be any suitable user interface, such as a remote control, mouse, trackball, keypad, keyboard, touchscreen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

The online meeting platform application may be implemented using any suitable architecture. For example, it may be a stand-alone application wholly implemented on each one of user equipment device 200 and user equipment system 201. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

Figure 3:
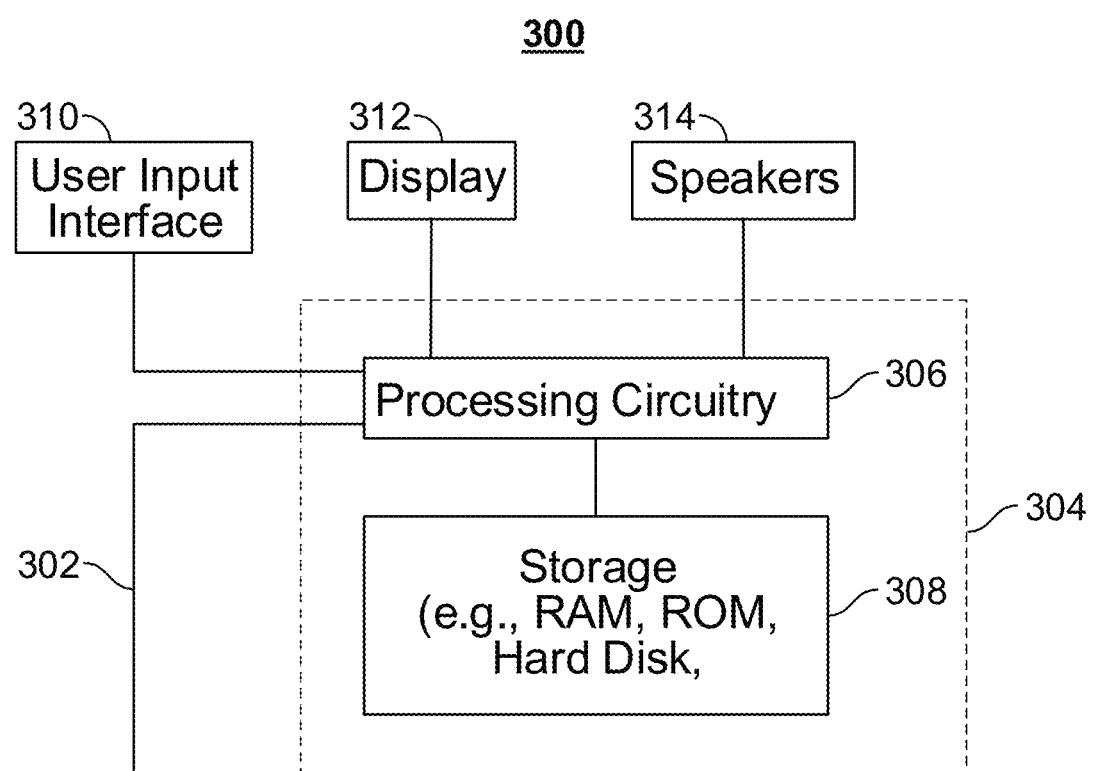
FIG. 3 is a block diagram of an illustrative user equipment device in accordance with some embodiments of the disclosure.

FIG. 3 illustrates user equipment device 200 in block diagram form. In the representation of FIG. 3, device 300, input/output 302, user input interface 310, display 312, speakers 314, control circuitry 304, processing circuitry 306, and storage 308 may correspond to embodiments of user equipment device 200, input/output path of circuit boards of set-top box 216, user interface input 210, display 212, speaker 214, circuit boards of set-top box 216, circuit boards of set-top box 216, and storage on circuit boards of set-top box 216, respectively. As shown in FIG. 3, processing circuitry 306 executes commands retrieved from storage 308, input/output path 302, and/or user input interface 310, and transmits results to display 312, 314, and/or output path 302. Such commands may include commands for implementing an online meeting platform such as by generating and displaying interface 10 on display 312, and retrieving and/or playing meeting recordings on display 312 and speaker 314. Commands may also include commands for transmitting meeting preferences to other computing devices such as server 426 described below, retrieving interface 10 data from server 426, requesting and retrieving selected content from server 426, and playing back retrieved content.

Figure 4:
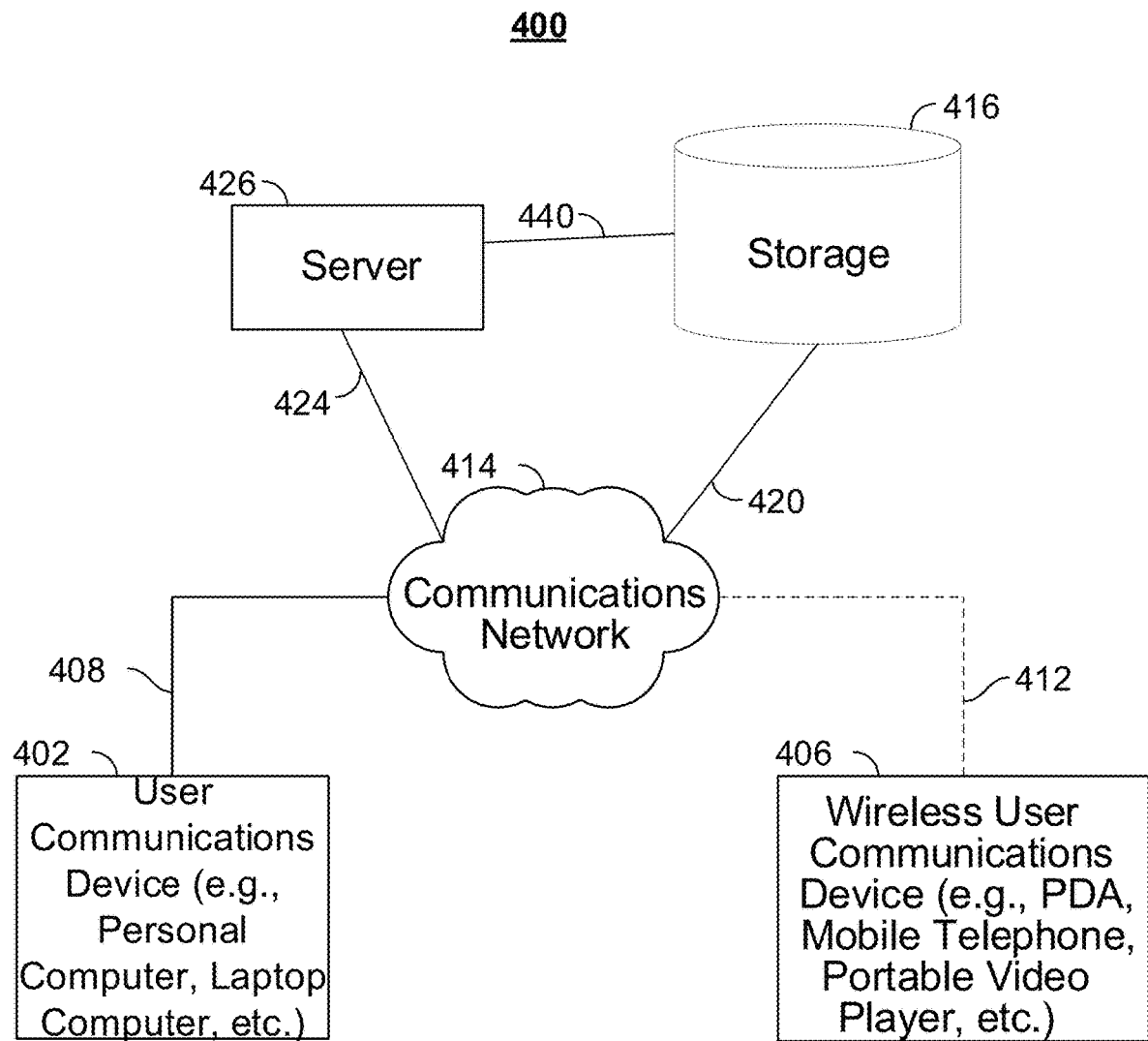
FIG. 4 is a block diagram of an illustrative online meeting system in accordance with some embodiments of the disclosure.

Each one of user equipment device 200 and user equipment system 201 of FIG. 2 can be implemented in system 400 of FIG. 4 as a user communications device 402, wireless user communications device 406, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which an online meeting platform application may be implemented, may function as a stand-alone device or may be part of a network of devices. Various network configurations of devices may be implemented and are discussed in more detail below.

A user equipment device utilizing at least some of the system features described above in connection with FIG. 2 may not be classified solely as a user communications device 402, or a wireless user communications device 406. For example, means for consuming content 402 may, like some system controller 404, be Internet-enabled allowing for access to Internet content, while system controller 404 may, like some television equipment 402, include a tuner allowing for access to television programming. The online meeting application may have the same layout on various different types of user equipment or may be tailored to the display capabilities of the user equipment. For example, on system controller 404, the meeting application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

The user equipment devices may be coupled to communications network 414. Namely, means for consuming content 402 and wireless user communications device 406 are coupled to communications network 414 via communications paths 408 and 412, respectively.

Communications network 414 may be one or more networks including the Internet, a mobile phone network, mobile voice or data network (e.g., a 4G or LTE network), cable network, public switched telephone network, or other types of communications network or combinations of communications networks. Paths 408 and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and path 408 is drawn as a solid line to it is a wired path (although these paths may be wireless paths, if desired). Communications with the user equipment devices may be provided by one or more of these communications paths but are shown as a single path in FIG. 4 to avoid overcomplicating the drawing.

Although communications paths are not drawn between user equipment devices, these devices may communicate directly with each other via communication paths, such as those described above in connection with paths 408 and 412, as well as other short-range point-to-point communication paths, such as USB cables, IEEE 1394 cables, wireless paths (e.g., Bluetooth, infrared, IEEE 402-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes storage 416 coupled to communications network 414 via communication path 420. Path 420 may include any of the communication paths described above in connection with paths 408, 410, and 412. Communications with the storage 416 may be exchanged over one or more communications paths but are shown as a single path in FIGS. 4 to avoid overcomplicating the drawing. In addition, there may be more than one storage 416, but only one is shown in FIG. 4 to avoid overcomplicating the drawing. If desired, storage 416 may be integrated as one source device. Although communications between storage 416 and user equipment devices 402, 404, and 406 are shown as occurring through communications network 414, in some embodiments, storage 416 may communicate directly with user equipment devices 402, 404, and 406 via communication paths (not shown) such as those described above in connection with paths 408 and 412.

Server 426 is coupled to communications network 414 via communication path 424 and coupled to storage 416 via communication path 440. Paths 424 and 440 may include any of the communication paths described above in connection with paths 408 and 412. Server 426 may obtain or receive media content from storage 416 via communication path 440.

Storage 416 may include preferences of meeting participants, as well as recorded meeting content, and may be any storage employing any one or more memories of any types, as well as associated controllers and the like. Storage 416 may be the originator of content (e.g., a television broadcaster, a webcast provider, etc.) or may not be the originator of content (e.g., an on-demand content provider, an Internet provider of content of broadcast programs for downloading, etc.). Storage 416 may include a remote server or memory used to store different types of data and content (including video content selected by a user), in a location remote from any of the user equipment devices.

Content and/or data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube, Netflix, and Hulu, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide curation data described above. In addition to content and/or data, providers of OTT content can distribute curation applications (e.g., web-based applications or cloud-based applications), or the content can be displayed by curation applications stored on the user equipment device.

System 400 is intended to illustrate a number of approaches, or network configurations, by which user equipment devices and sources of content and curation may communicate with each other for the purpose of providing online meeting services. The embodiments described herein may be applied in any one or a subset of these approaches, or in a system employing other approaches for provision of online meetings.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

Figure 5:
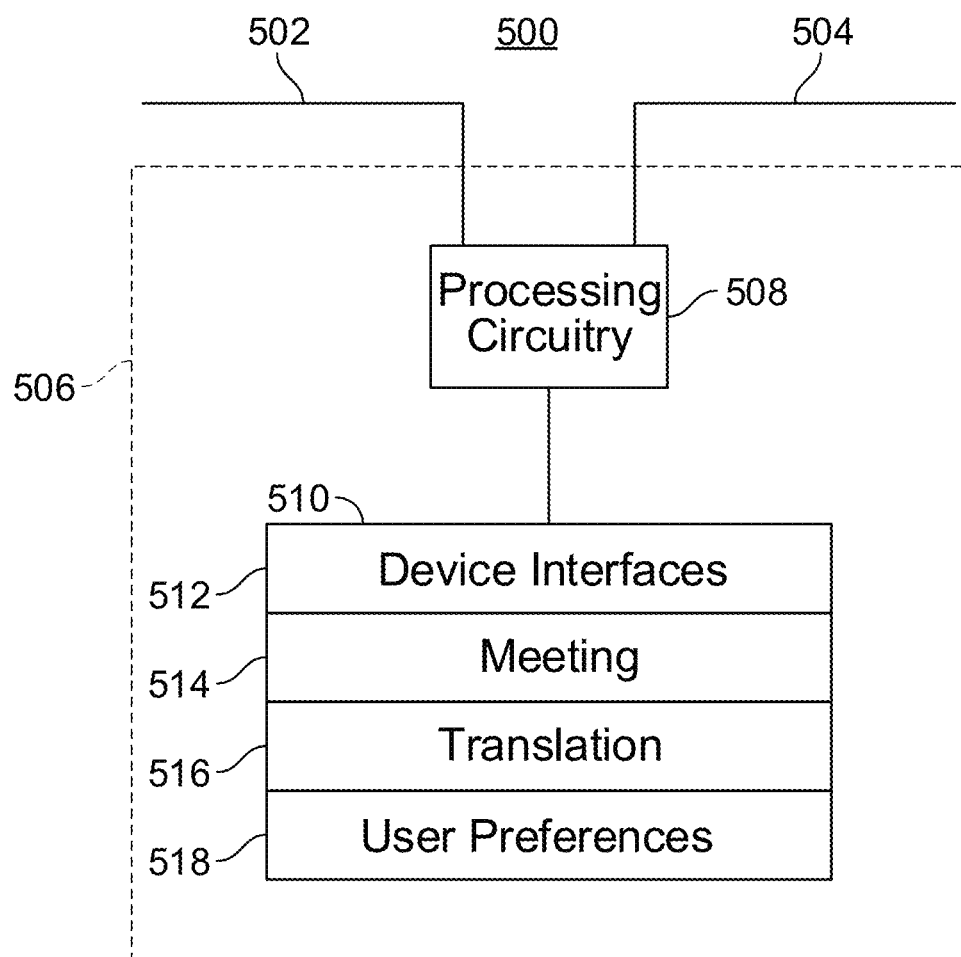
FIG. 5 is a block diagram representation of an illustrative server constructed according to embodiments of the disclosure.

FIG. 5 is a generalized embodiment of an illustrative server 426 constructed for use according to embodiments of the disclosure. Here, device 500 may be a server 426. Device 500 may receive content and data via I/O paths 502 and 504. I/O path 502 may provide content and data, such as online meetings, to the various display devices 70, while I/O path 504 may provide data to, and receive content from, one or more storages 416. Like the user equipment device 300, the device 500 has control circuitry 506 which includes processing circuitry 508 and storage 510. The control circuitry 506, processing circuitry 508, and storage 510 may be constructed, and may operate, in similar manner to the respective components of user equipment device 300.

Storage 510 is a memory that stores a number of programs for execution by processing circuitry 508. In particular, storage 510 may store a number of device interfaces 512, an online meeting platform module 514, translation module 516 for translating meeting audio into different languages, and user preferences 518. The device interfaces 512 are interface programs for handling the exchange of commands and data with the various display devices 70. Online meeting platform module 514 is a code module for implementing an online meeting according to the processes described herein, and user preferences 518 are stored meeting presentation preferences entered by meeting participants. A separate interface 10 may exist for each different display device 70. Interface code may be stored in storage 510 and implemented by device 500, or may be stored in and implemented by each display device 70.

The device 500 may be any electronic device capable of receiving meeting audio and video and transferring them to one or more display devices 70 within an interface 10. For example, the device 500 may be a server located at any site, such as co-located with one or more of the meeting participants, or located remote from any or all of the meeting participants. The device 500 may alternatively be a laptop computer or desktop computer configured as above.

Figure 6:
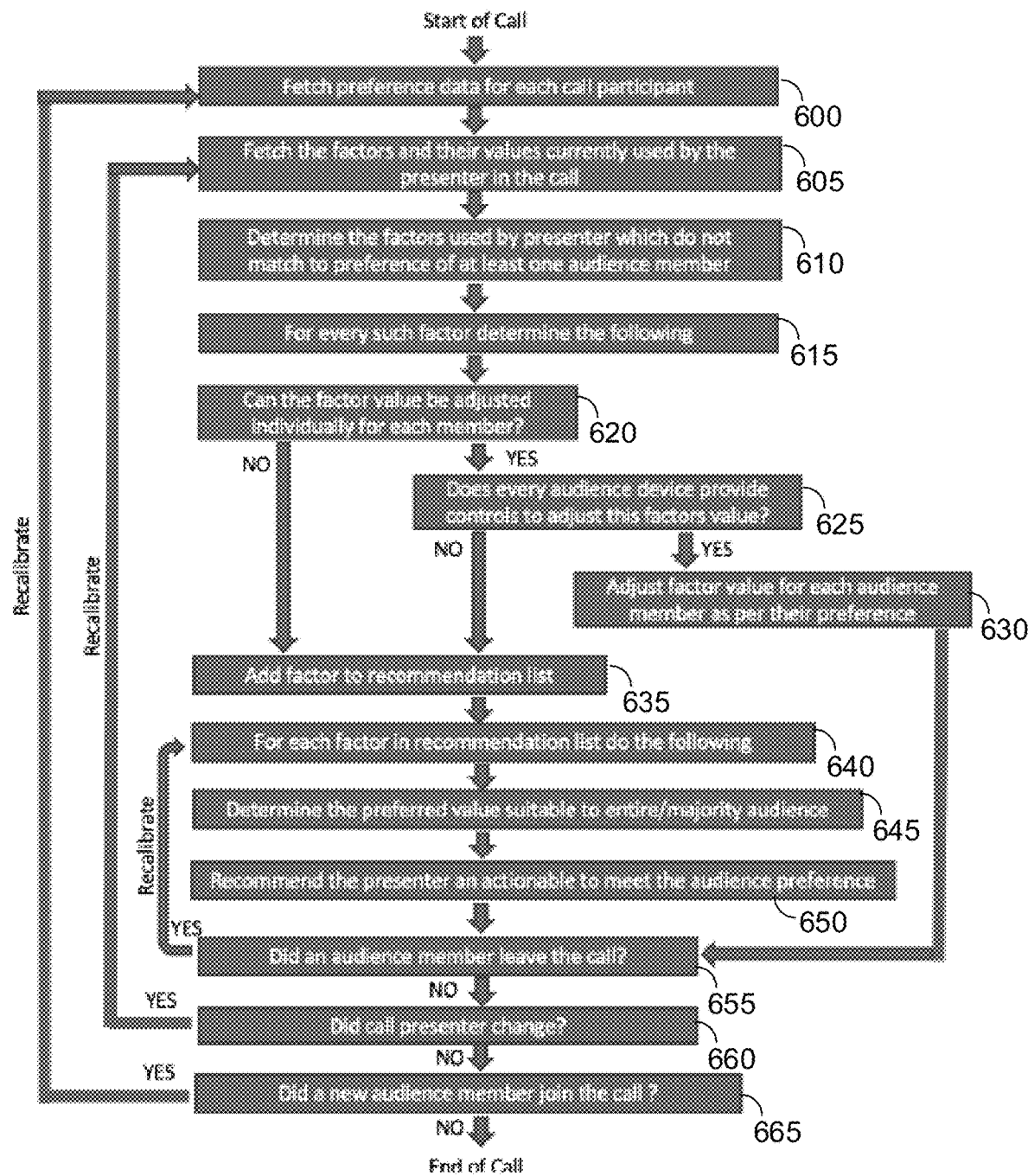
FIG. 6 is a flowchart illustrating determination and display of participant preferences in accordance with embodiments of the disclosure.

FIG. 6 is a flowchart illustrating determination and display of participant preferences in accordance with embodiments of the disclosure. As above, embodiments of the disclosure contemplate display of participant preferences to other meeting participants, such as those speaking, sharing their screen, or otherwise presenting during the meeting. A process for determination and display of participant preferences may include meeting module 514 retrieving preference data for each meeting participant (Step 600). Preference data may be stored in, and retrieved from, any suitable memory such as storage 416, and may be determined in any suitable manner. For example, module 514 may query meeting participants for their preferences at the beginning of the meeting or any time prior thereto, e.g., when participants create an account. Retrieved preference data may also include saved preferences from prior meetings, previously generated participant profile information, or the like. Preferences may be of any type describing any meeting parameter. As above, preferences, may include parameters such as preferred language spoken in the meeting, preferred speech speed (e.g., wpm), preferred volume, preferred video settings, or the like. Preference data may also be retrieved for each meeting invitee rather than just those who are actually participating in the meeting, for each invitee who has confirmed their attendance, or the like. Preference data may also be determined from information including participant location, time zone, company or industry information, demographics, or the like. For example, in some embodiments of the disclosure, the language preference of participants located in a particular country or region may by default be set to the official language of that country, or the predominant language of that region. To that end, storage 416 may store a database of geographic areas and their associated demographic information, such as predominant or official language, known cultural preferences, predominant businesses or industries and any known associated meeting preferences, or the like.

Meeting module 514 may then determine preference values currently employed in the meeting (Step 605). That is, meeting module 514 determines current values of those preferences retrieved in Step 600. For example, if module 514 retrieved preferences for language, speech speed, and volume at Step 600, current values of each of language, speech speed, and volume are determined. Current values of retrieved preferences may be determined in any manner, such as from presenter profiles or other meeting information entered by or displayed for participants.

For instance, the currently-spoken language may be determined via one or more machine learning models trained to identify a spoken language from audio input of speech. In some embodiments, current meeting volume may be determined via decibel measurements of meeting audio. In some embodiments, current speech speed may be estimated according to the rate at which identified syllables or other characteristic audible speech is uttered, determined via natural language processing (NLP) or other methods which identify and transcribe spoken words of a portion of speech. In this example, identified words may be counted and their number divided by the amount of time taken by that portion of speech, to determine, e.g., words per minute spoken.

Meeting module 514 may then determine which current preference values or factors do not match the preferences of at least one audience member (Step 610). For every such current preference value (Step 615), module 514 checks whether that current preference value can be adjusted individually for each meeting participant (Step 620). If the answer to this inquiry is negative, module 514 adds this factor to a recommendation list (Step 635) for subsequent presentation to meeting speakers or others. If the answer to the inquiry of Step 620 is instead positive, module 514 then checks whether every participant's device 70 provides controls to adjust this factor's value (Step 625). If the answer to this inquiry is negative, module 514 proceeds to Step 635, adding this factor to the recommendation list. Otherwise, this factor can be adjusted individually for every participant, and module 514 does so accordingly (Step 630). Individual adjustment may be performed in any manner, such as by transmission of instructions to each device 402, 406 by server 426, to adjust or set these factors accordingly. In some embodiments, an alert may also be transmitted to each device 402, 406 allowing users to confirm or cancel the adjustments. After Step 630, module 514 proceeds to Step 655, as further described below.

The result of Steps 600-625 is a recommendation list containing those factors or preferences which at least one meeting participant wants the current speaker to change. For each factor in the list, meeting module 514 takes certain actions (Step 640), including determining the preferred factor value suited to the audience (Step 645). This may be the preferred value of any portion of the meeting participants, determined in any manner. In some embodiments, module 514 may determine the preferred value according to majority preference. Thus, for instance, the preferred language may be the language expressed as a preference by the majority of participants. In some embodiments, the preferred value may be determined as the value preferred by the most participants, even if not a majority. In some embodiments, the preferred value may be that preferred by all participants, or by any portion thereof.

Meeting module 514 may then present this recommendation list to the current speaker, such as via an actionable instruction, action item, or suggestion to meet the audience preference (Step 650). For example, as in FIG. 1A, audience preferences 20 may be presented within the current speaker's interface 10, instructing or suggesting to the speaker to adjust his or her delivery in a manner that more closely meets the audience's preferences. In this manner, module 514 encourages meetings to progress more closely along participant preferences, thus increasing participant interest and engagement with the meeting. Recommendations may also be presented as templates or any predetermined format for presenting recommendations. For example, in some embodiments, meeting module 514 may determine recommendations and insert them into the following template: "There is an audience preference to please (increase/decrease) (factor name) to around (factor value)." Thus, for instance, when a speaker is speaking faster than a preferred participant speech speed, module 514 may display a message such as "There is an audience preference to please decrease speech speed to around 40 words per minute."

In embodiments of the disclosure, meeting module 514 also updates its preference values, to more accurately track and respond to participant preferences that may change over time. Thus, in some embodiments, module 514 may check to determine whether any audience member or meeting participant has left the call (Step 655), and if so, returns to Step 640 to update the recommendation list. Otherwise, if no audience member has left the meeting, module 514 determines whether the speaker or presenter has changed (Step 660), such as by determining whether a self-designated speaker flag has changed state, automatically designating a current speaker according to detected words, i.e., who is speaking at any given time or who has been speaking for greater than some threshold period of time, who is sharing their screen, who is the designated speaker according to a meeting agenda or schedule, an analysis of verbal cues such as words or phrases indicating transition to another speaker (e.g., "Now I would like to give David the floor . . . "). Thus, for example, meeting module 514 may analyze a meeting agenda and designate current speakers according to the times allotted for certain speakers. Any method of detecting a speaker is contemplated, and checks for current speaker may be made at any time, such as periodically at any intervals, upon detection of any amount of speech from any participant, and the like. If a change in speaker or presenter is detected, the process returns to Step 605 to determine the presentation factor values used by the new speaker, e.g., how fast he or she is speaking, the language used, how loud he or she is now speaking, and the like. Otherwise, if no change has been made to the meeting speaker, module 514 may determine whether any new participant has joined the meeting (Step 665), and returns to Step 600 to retrieve his or her preferences, if so, beginning the process of FIG. 6 again for the newly-revised set of meeting participants. This process may continue until the end of the meeting.

In some embodiments, module 514 may keep track of those participants who leave the meeting early (i.e., at Step 655), and those who join late (i.e., at Step 665), to note those participants who missed a portion of the meeting. Module 514 may also keep track of those invitees who missed the meeting entirely. These participants/invitees may be sent a recording of those portions of the meeting that they missed, according to times when they joined/left. Participants/invitees may also, or alternatively, be sent a recording of the entire meeting with missed portions marked or indicated in any manner. In this manner, participants/invitees may be able to catch up on missed meeting content.

Figure 7:
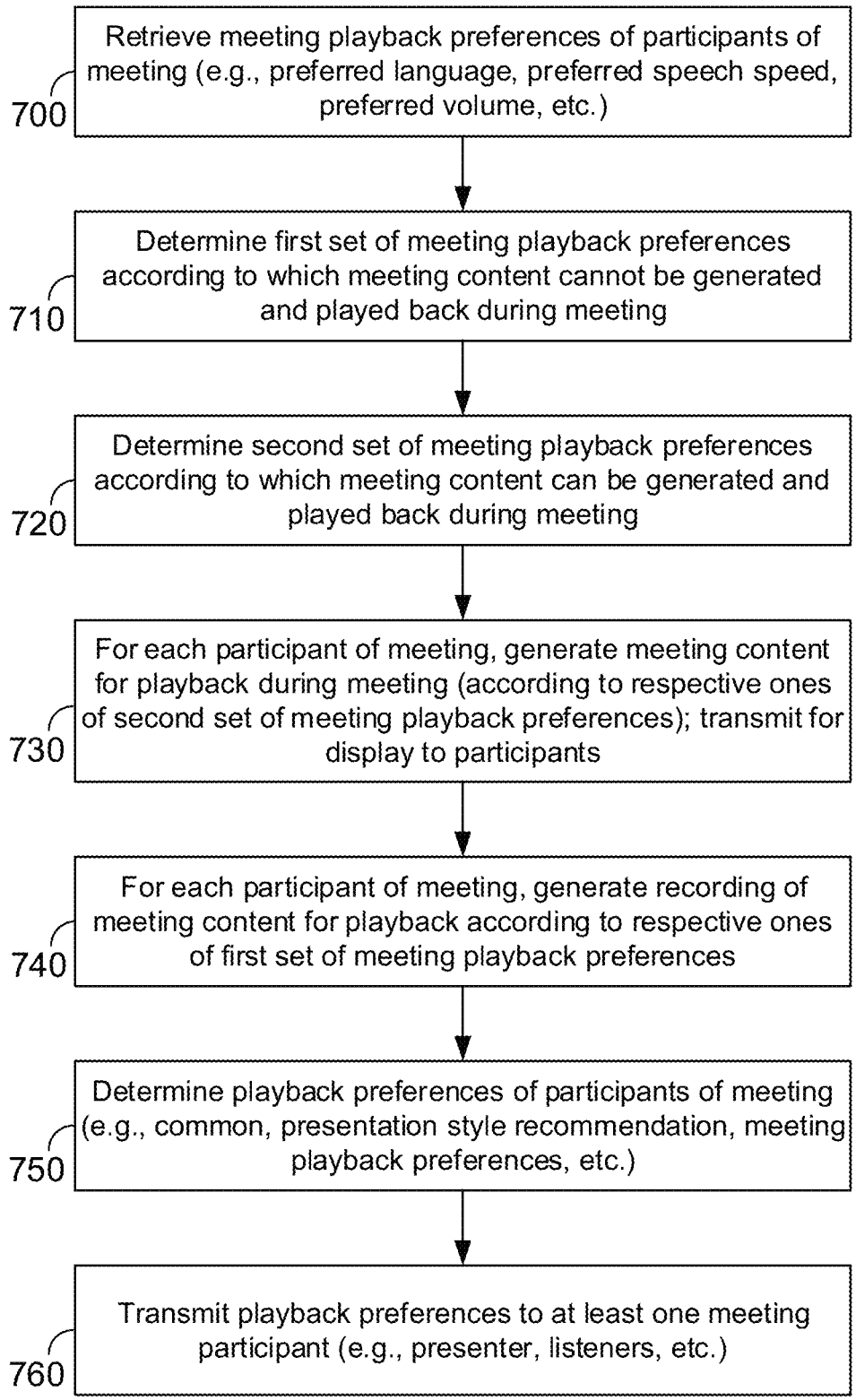
FIG. 7 is a flowchart illustrating meeting display and recording generation according to embodiments of the disclosure.

As above, embodiments of the disclosure also contemplate individualized display and recording of meetings that meet each participant's preferences. FIG. 7 is a flowchart illustrating meeting display and recording generation according to embodiments of the disclosure. Here, meeting module 514 may retrieve meeting playback preferences of participants of a meeting (Step 700). Similar to Step 600 of FIG. 6, module 514 may retrieve the stored preferences of each participant from storage 416, may query participants for their preferences, or may determine participant preferences in any other manner. Preference data may also be retrieved for each meeting invitee rather than just those who are actually participating in the meeting, for each invitee who has confirmed their attendance, or the like. Preference data may also be determined from information including participant location, time zone, company or industry information, demographics, or the like.

Module 514 may then determine a first set of meeting playback preferences, according to which meeting content cannot be generated and played back during the meeting (Step 710). That is, module 514 may determine those preferences that cannot be met in real time, or during the meeting itself. For instance, audience preferences for a language that the current speaker does not speak, may not be able to be met during the meeting. Module 514 also determines a second set of meeting playback preferences, according to which meeting content can be generated and played back during the meeting (Step 720). That is, unlike in Step 710, module 514 determines those meeting preferences that can be met in real time, or during the meeting itself. For example, the volume level of meeting broadcast or playback may be readily altered to match participant preferences. That is, the volume level at which each participant's audio and video stream is played is a preference that can be altered as desired in real time or during the meeting, according to participant preferences.

For each meeting participant, module 514 then generates meeting content, e.g., a live feed of the meeting, for playback (Step 730). In some embodiments, meeting content is generated according to the second set of meeting playback preferences determined above in Step 720. That is, module 514 generates a separate meeting feed for each call participant, where this individualized feed is generated according to those participant preferences that can be adjusted in real time, during the meeting. For example, each participant may receive live meeting video via his or her interface 10, played at his or her individual preferred settings, e.g., at his or her preferred volume, or the like. Different participants may thus receive their meeting feeds through their interface 10, at differing settings, providing more individualized meeting experiences.

Here, meeting content may be any content of or related to the meeting. For example, meeting content may include recorded audio and video signals of the meeting, as well as any presentations or other material displayed for the meeting participants, by, e.g., meeting speakers.

For each meeting participant, module 514 also generates a recording of meeting content for playback according to each participant's first set of meeting playback preferences (Step 740). That is, meeting module 514 records the meeting, and sends individual copies of the recording to each participant, for playback according to each separate participant's preferences. Thus, for example, after the meeting, one participant may receive a copy of the meeting recording, set to his or her desired volume, speed, and language settings, while another participant may receive a copy of the meeting recording set for playback at different volume, speed, and language settings, according to his or her individual preferences.

Recordings may be set to different languages in any manner. In some embodiments, recordings may be automatically translated into each participant's desired language using machine learning-based methods, as above. In some embodiments, recordings may be set for playback at each participant's preferred speed, so that playback is performed at each individual's preferred speaker wpm, or a corresponding metric such as meeting-average wpm, speaker-average wpm, or the like. In this manner, even if certain individual preferences cannot be satisfied during the meeting itself, each participant may be sent a recording of the meeting which is set for playback according to those preferences. Thus, regardless of whether preferences can each be met in a live context, each participant may receive at least a recording that helps to meet various preferences.

Module 514 may also customize recordings in any manner besides, or in addition to, following participant preferences. In some embodiments, preferences may include preferences for particular camera views, and module 514 may record from separate video and/or audio source(s) such as alternate cameras or the like, according to those view preferences. Similarly, recordings may include content such as chat content and the like, according to participant preferences. In some embodiments, recordings may also include a transcript of the meeting, such as a closed caption, if preferred by individual participants. Module 514 may, in some embodiments, also send transcripts to participants prior to sending the recording, for transcript review, editing, and/or approval. In some embodiments, module 514 may also notify participants whether their recording has been personalized according to their preferences, or is an unaltered recording. In this manner, module 514 may generate separate meeting recordings for each individual participant or invitee, customized according to his or her individual preferences, where those preferences may include particular video and/or audio sources, any meeting content, any presentation style, any closed captions in any language, dubbing or translation into any language, at any speed and/or volume, and according to any other preference.

As above, embodiments of the disclosure may also include display of preferences during the meeting, to speakers and/or other meeting participants. Meeting module 514 may thus determine playback preferences of meeting participants (Step 750), and transmit these playback preferences to at least one meeting participant, e.g., meeting presenters or speakers, each participant, or the like (Step 760). As previously described, playback preferences may be determined in any manner, such as by determining an average value for each preference based on every participant's preference value, common preference values preferred by more than one participant, values preferred by a majority or by more than any other value but less than a majority, or the like. Playback preferences may be transmitted as numerical or other values, such as display metrics 30, or may be formulated as recommendations 40, e.g., presentation style recommendations, such as recommendations to speak faster, speak louder, or the like, rather than numerical value recommendations such as a specific wpm or volume level.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any type of participant preference may be retrieved, and any corresponding metrics may be calculated and displayed for any meeting participants. Display and recording may also be performed and altered for playback according to any values of any preferences. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
   detecting a presenter change in a conference call having a plurality of participants;
   determining a presentation factor associated with a new presenter after the presenter change;
   determining that a user equipment device associated with a first participant, from the plurality of participants, does not provide controls to adjust the user equipment device for accommodating the presentation factor;
   in response to the determination that the user equipment device associated with the first participant does not provide controls to adjust the user equipment device for accommodating the presentation factor, for the first each participant of the conference call, automatically generating the conference call content for playback during the conference call without accommodating the presentation factor; and for the remaining participants of the conference call, automatically generating a recording of the conference call with the presentation factor.

2. The method of claim 1, wherein, detecting a presenter change in a conference call comprises:

receiving speech from a current presenter in a conference call;

determining whether the speech contains any verbal cues indicating a transition to another presenter; and in response to detecting that the verbal cues indicate the transition to another presenter, determining that the presenter change has occurred.

3. The method of claim 1, wherein, detecting a presenter change in a conference call comprises:

obtaining a conference call agenda; and determining based on a time slot in the conference call agenda that a presenter change has occurred.

4. The method of claim 1, wherein, detecting a presenter change in a conference call comprises:

detecting speech from a new participant, from the plurality of participants, in the conference call;

determining whether the new participant's speech exceeds a threshold period of time; and in response to detecting that the new participant's speech exceeds the threshold period of time, determining that a presenter change has occurred.

5. The method of claim 1, wherein the presentation factor relates to pace of speech of the new presenter.

6. The method of claim 1, wherein the presentation factor relates to language used by the new presenter.

7. The method of claim 1, wherein the presentation factor relates to volume of speech of the new presenter.

8. The method of claim 1, further comprising:

monitoring at predetermined intervals whether the presenter change in the conference call has occurred; and upon detecting based on the monitoring that the presenter change has occurred, updating the presentation factor preferences for the new presenter.

9. The method of claim 1, further comprising:

determining that a second participant, from the plurality of participants, in the conference call has left the conference call; and in response to the determination that the second participant has left the conference call, determining which portion of the conference call was missed by the second participant due to the second participant leaving the conference call.

10. The method of claim 9, further comprising automatically generating the recording of the conference call for the second participant, wherein the recording generated is only for those portions of the conference call that were missed by the second participant due to the second participant leaving the conference call.

11. A system comprising:

a storage device; and control circuitry configured to:

detect a presenter change in a conference call having a plurality of participants;

determine a presentation factor associated with a new presenter after the presenter change;

determine that a user equipment device associated with a first participant, from the plurality of participants, does not provide controls to adjust the user equipment device for accommodating the presentation factor;

in response to the determination that the user equipment device associated with the first participant does not provide controls to adjust the user equipment device for accommodating the presentation factor, for the first each participant of the conference call, generate the conference call content for playback during the conference call without accommodating the presentation factor and store the conference call content for playback in the storage device; and for the remaining participants of the conference call, automatically generate a recording of the conference call with the presentation factor and store the conference call content with the presentation factor for playback in the storage device.

12. The system of claim 11, wherein, detecting a presenter change in a conference call comprises, the control circuitry configured to:

receive speech from a current presenter in a conference call;

determine whether the speech contains any verbal cues indicating a transition to another presenter; and in response to detecting that the verbal cues indicate the transition to another presenter, determine that the presenter change has occurred.

13. The system of claim 11, wherein, detecting a presenter change in a conference call comprises, the control circuitry configured to:

obtain a conference call agenda; and determine based on a time slot in the conference call agenda that a presenter change has occurred.

14. The system of claim 11, wherein, detecting a presenter change in a conference call comprises, the control circuitry configured to:

detect speech from a new participant, from the plurality of participants, in the conference call;

determine whether the new participant's speech exceeds a threshold period of time; and in response to detecting that the new participant's speech exceeds the threshold period of time, determine that a presenter change has occurred.

15. The system of claim 11, wherein the presentation factor relates to pace of speech of the new presenter.

16. The system of claim 11, wherein the presentation factor relates to language used by the new presenter.

17. The system of claim 11, wherein the presentation factor relates to volume of speech of the new presenter.

18. The system of claim 11, further comprising, the control circuitry configured to:

monitor at predetermined intervals whether the presenter change in the conference call has occurred; and upon detecting based on the monitoring that the presenter change has occurred, update the presentation factor preferences for the new presenter.

19. The system of claim 11, further comprising, the control circuitry configured to:

determine that a second participant, from the plurality of participants, in the conference call has left the conference call; and in response to the determination that the second participant has left the conference call, determine which portion of the conference call was missed by the second participant due to the second participant leaving the conference call.

20. The system of claim 19, further comprising, the control circuitry configured to automatically generate the recording of the conference call for the second participant, wherein the recording generated is only for those portions of the conference call that were missed by the second participant due to the second participant leaving the conference call.

* * * * *